United States Patent
Wartmann et al.

(10) Patent No.: US 8,503,077 B2
(45) Date of Patent: Aug. 6, 2013

(54) TUBE UNIT FOR MICROSCOPES

(75) Inventors: Rolf Wartmann, Waake (DE); Hubert Wahl, Stadtroda (DE)

(73) Assignee: Carl Zeiss Microimaging GmbH, Jena (DE)

(*) Notice: Subject to any disclaimer, the term of this patent is extended or adjusted under 35 U.S.C. 154(b) by 334 days.

(21) Appl. No.: 12/867,864

(22) PCT Filed: Jan. 28, 2009

(86) PCT No.: PCT/EP2009/000524
§ 371 (c)(1),
(2), (4) Date: Aug. 16, 2010

(87) PCT Pub. No.: WO2009/103403
PCT Pub. Date: Aug. 27, 2009

(65) Prior Publication Data
US 2010/0315706 A1 Dec. 16, 2010

(30) Foreign Application Priority Data
Feb. 19, 2008 (DE) .................. 10 2008 009 914

(51) Int. Cl.
G02B 21/00 (2006.01)
(52) U.S. Cl.
USPC ........................................ 359/368; 359/384
(58) Field of Classification Search
USPC ......................................... 359/367, 368, 384
See application file for complete search history.

(56) References Cited

U.S. PATENT DOCUMENTS

| 4,299,439 A | * | 11/1981 | Stromblad | 359/384 |
| 4,576,450 A | * | 3/1986 | Westphal | 359/384 |
| 4,691,997 A | * | 9/1987 | Muchel | 359/364 |
| 5,532,872 A | * | 7/1996 | Sakamoto et al. | 359/384 |
| 5,657,158 A | | 8/1997 | Baumann et al. | |
| 5,793,525 A | * | 8/1998 | Sabin et al. | 359/384 |
| 6,188,515 B1 | | 2/2001 | Nihoshi | |
| 6,781,774 B2 | * | 8/2004 | Weber et al. | 359/831 |
| 7,158,293 B2 | * | 1/2007 | Hund et al. | 359/384 |
| 7,583,435 B2 | | 9/2009 | Euteneuer et al. | |
| 2004/0141231 A1 | | 7/2004 | Hund et al. | |
| 2004/0190128 A1 | | 9/2004 | Hund et al. | |
| 2005/0128573 A1 | * | 6/2005 | Merz | 359/381 |
| 2006/0012861 A1 | * | 1/2006 | Euteneuer et al. | 359/384 |

FOREIGN PATENT DOCUMENTS

| DE | 195 13 870 C2 | 10/1996 |
| DE | 196 24 166 C1 | 10/1997 |
| DE | 103 00 455 A1 | 7/2004 |
| DE | 10 2004 006 937 A1 | 9/2005 |

\* cited by examiner

*Primary Examiner* — Frank Font
(74) *Attorney, Agent, or Firm* — Patterson Thuente Pedersen, P.A.

(57) ABSTRACT

A tube unit for microscopes which has a tube lens, including two components with an intermediate, large air separation, and an overall positive refractive power. The air separation is at least half the size of the focal length f of the tube lens. A roof edge mirror or another suitable deflection element is arranged between the two components of the tube lens. The roof edge mirror includes two mirrors, which can be tilted with respect to one another, and which is able to be tilted around its roof edge. The tilting movement or the tilting angle of the tiltable mirror or deflection element corresponds to half the tilt or half the tilting angle of the tube or eyepiece viewing system.

5 Claims, 1 Drawing Sheet

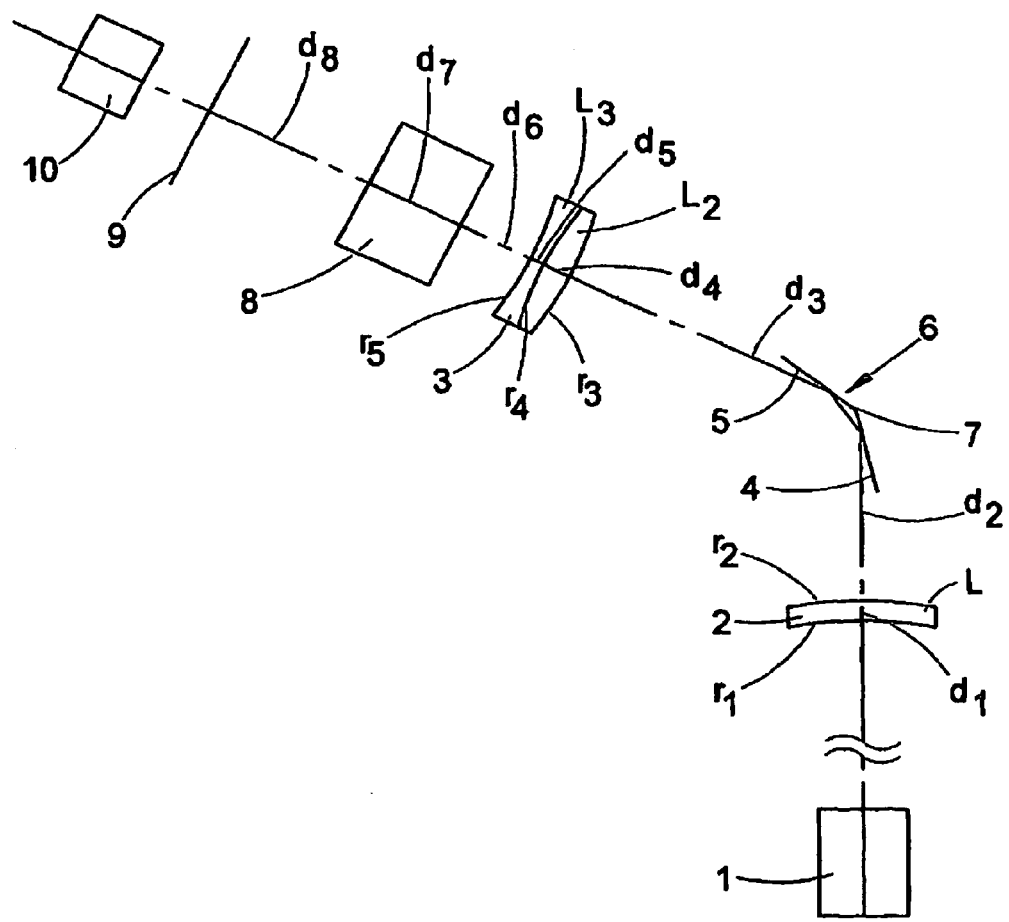

TUBE UNIT FOR MICROSCOPES

PRIORITY CLAIM

The present application is a National Phase entry of PCT Application No. PCT/EP2009/000524, filed Jan. 28, 2009, which claims priority from German Application Number 102008009914.7, filed Feb. 19, 2008, the disclosures of which are hereby incorporated by reference herein in their entirety.

FIELD OF THE INVENTION

The invention relates to a tube unit for microscopes, particularly, an angle-adjustable ergo tube, for the realization of an ergonomic view into the eyepiece of the microscope.

BACKGROUND

Ergonomic tubes, so-called ergo tubes, are known which allow for variable heights, angles, and distances in ergonomically favorable positions. These assemblies are very elaborate and, as a result, also very expensive. Simpler ergo tubes solely allow for adjustments in height and angle. Therefore, said tubes are also more cost-efficient but do not fulfill all requirements.

From DE 10 2004 006 937 A1, a tube for a microscope is known, wherein the ergonomic function is realized by means of a tilting mirror. Said mirror is swiveled half as fast as the tube viewer. The correct image orientation is achieved via a second mirror. The additional space required due to both mirrors is created by means of an elaborate tube lens design, which shifts the principal planes. The back focus of the individual tube lens system is elongated by a factor of up to 1.25. Such optics designs inevitably cause problems with the image quality, whereby particularly the position of the exit pupil is affected negatively. Vignetting and lateral chromatic aberrations occur.

DE 195 13 870 C2 describes a binocular microscope with a lens corrected to infiniti, and a downstream two-lens tube lens unit with a back focus of more than 200 mm. Thereby, the lens on the side of the object is a diffuser lens made of flint glass with Abbe numbers between 43 and 47. The lens away from the object is a condenser lens made of crown glass with Abbe numbers between 65 and 69. A reverse configuration of the two lenses of the tube lens unit is also described.

SUMMARY OF THE INVENTION

Therefore, it is an object of the invention to create a tube unit with adjustable angle for microscopes, whereby an elongation of the back focus is avoided, the image quality improved, and vignetting largely eliminated.

A preferable tube unit has resulted from the realization of the design data, listed in the table below, whereby slight deviations from the cited data may well occur in the form of tolerances caused by the manufacture:

| Element | Radius r [mm] | Thickness d [mm] | $N_e$ | $v_e$ |
|---|---|---|---|---|
| $L_1$ | −160.7966 | 3.0 | 1.67765 | 31.84 |
|  | −93.7321 | 50.104 |  |  |
| Roof edge mirror | ∞ | 50.0 |  |  |
| $L_2$ | 81.1674 | 4.5 | 1.60994 | 56.37 |
|  | −188.37 | 2.5 | 1.58482 | 40.47 |
| $L_3$ | 165.4881 | 5.0 |  |  |
| Prism (glass path) | ∞ | 101.0 | 1.51872 | 64.0 |
| Air path | ∞ | 37.382 |  |  |
| Intermediate image plane, |  |  |  |  | whereby the focal length f of the tube lens equals 164.5 mm, and the entrance pupil is positioned at −125.9 mm, and r are the radii of the optical elements and d the thicknesses of the optical paths.

With the invention, an ergo tube with adjustable angles is realized, whereby an elongation of the back focus is avoided. A higher image quality is achieved and no appreciable vignetting on the image occurs.

BRIEF DESCRIPTION OF THE DRAWING

In the following, the invention shall be further explained by means of an example embodiment.

FIG. 1 is a diagram of the assembly of the optical elements of the ergo tube according to an embodiment of the invention.

DETAILED DESCRIPTION

Referring to FIG. 1, the tube unit, positioned in the direction of the light downstream of the microscope lens includes a tube lens having two components 2 and 3, whereby the first component includes a single lens $L_1$, and the second component includes a lens group of two lenses $L_2$ and $L_3$. The air path $a=d_2+d_3$ between the two components is at least half as long as the focal length f of the entire tube lens, i.e., $a \geq 0.5$ f. The tube lens exhibits altogether positive refractive power.

Positioned in the space between the two components 2 and 3 of the tube lens, is a roof edge mirror 6 with a roof edge 7 including two mirrors 4 and 5. The roof edge mirror 6 is tiltable around its roof edge 7, whereby its tilt corresponds with half the tilting of the tube viewer. A prism group 8 with a glass path $d_7=101.0$ mm is positioned downstream of the second component 3 separated by an air path of $d_6$. Behind the prism group 8, at a distance of $d_8=37.382$ mm, an intermediate image plane 9 is provided, which can be observed through the subsequent eyepiece 10. Through the prism group 8, the eyepiece beam paths for the binocular tube viewer are realized.

The following table shows the design data of a preferred tube unit, according to an example embodiment of the invention.

| Element | Radius r [mm] | Thickness d [mm] | $N_e$ | $v_e$ |
|---|---|---|---|---|
| $L_1$ | −160.7966 | 3.0 | 1.67765 | 31.84 |
|  | −93.7321 | 50.104 |  |  |
| Roof edge mirror | ∞ | 50.0 |  |  |
| $L_2$ | 81.1674 | 4.5 | 1.60994 | 56.37 |
|  | −188.37 | 2.5 | 1.58482 | 40.47 |
| $L_3$ | 165.4881 | 5.0 |  |  |
| Prism (glass path) | ∞ | 101.0 | 1.51872 | 64.0 |
| Air path | ∞ | 37.382 |  |  |
| Intermediate image plane, |  |  |  |  | whereby the focal length f of the tube lens equals 164.5 mm, and the entrance pupil is positioned at −125.9 mm, and r are the radii of the optical elements and d the thicknesses of the optical paths.

The invention was described and explained with regard to a an example embodiment. However, for one of ordinary skill in the art it is self-evident that changes and variations can be executed without leaving the protective realm of the following Claims.

Legend

| | |
|---|---|
| 1 | Microscope lens |
| 2 | Component |
| 3 | Component |
| 4 | Mirror |
| 5 | Mirror |
| 6 | Roof edge mirror |
| 7 | Roof edge |
| 8 | Prism group |
| 9 | Intermediate image plane |
| 10 | Eyepiece |
| $r_1$ to $r_5$ | Radius |
| $d_1$ to $d_8$ | Thickness, distance |
| $L_1$ to $L_3$ | Lens |
| a | Air path |

The invention claimed is:

1. A tube unit for microscopes, the tube unit being angularly adjustable providing a tilt angle, the tube unit positioned above a microscope lens, the tube unit comprising:
   tube lens with overall positive refractive power and a focal length f, including two focusing components separated by an air path, wherein the air path is at least half as long as the focal length f of the tube lens; and
   a roof edge mirror comprising two adjacent mirrors having a roof edge therebetween one of the two mirrors being a tilting mirror tiltable with respect to the other of the two mirrors, the roof edge mirror being positioned between the two focusing components of the tub lens, wherein when the tube unit is angularly adjusted providing a tilt angle, the tilt angle of the tilting mirror corresponds to half of the tilt angle of the tube unit;
   wherein the two focusing components comprise a first component comprising a single lens unit positioned between the microscope lens and the roof edge mirror, and a second component comprising only two lenses positioned between the roof edge mirror and a prism group.

2. A tube unit for microscopes positionable between an eyepiece and a microscope lens, the tube unit providing a tilt movement, the tube unit comprising
   tube lens with overall positive refractive power and a focal length, including two focusing components, a first component and a second component, separated by an air path between them, wherein the air path is greater than or equal to half the focal length of the tube lens; and
   a tillable deflecting element, the tiltable deflecting element being positioned between the two focusing components of the tube lens and wherein tilt movement of the deflecting element corresponds with half of the tilt movement of the tube unit;
   wherein intermediate the microscope lens and the deflecting element, there is only a single focusing component, the first component, and said first component comprises only a single lens.

3. The tube unit, according to claim 2, wherein the tiltable deflecting element comprises a roof edge mirror.

4. The tube unit, according to claim 3, wherein the roof edge mirror is tiltable around its roof edge and includes two mirrors that are tiltable relative to each other and one of the two mirrors being a tilting minor, wherein the tilt movement and/or the tilt angle of the tilting mirror corresponds to half of the tilt and/or half of the tilt angle of the tube or eyepiece viewer.

5. The tube unit, according to claim 2 wherein the first component is a refractive lens.

* * * * *

UNITED STATES PATENT AND TRADEMARK OFFICE
CERTIFICATE OF CORRECTION

PATENT NO. : 8,503,077 B2  
APPLICATION NO. : 12/867864  
DATED : August 6, 2013  
INVENTOR(S) : Rolf Wartmann et al.

It is certified that error appears in the above-identified patent and that said Letters Patent is hereby corrected as shown below:

On title page item [73] "Assignee", delete "Microimaging" and insert --Microscopy--

In the Specification

Col. 3, line 2, delete "a"

Col. 4, line 30, delete "minor" and insert --mirror--

Signed and Sealed this
Nineteenth Day of August, 2014

Michelle K. Lee
*Deputy Director of the United States Patent and Trademark Office*